United States Patent Office 2,734,018
Patented Feb. 7, 1956

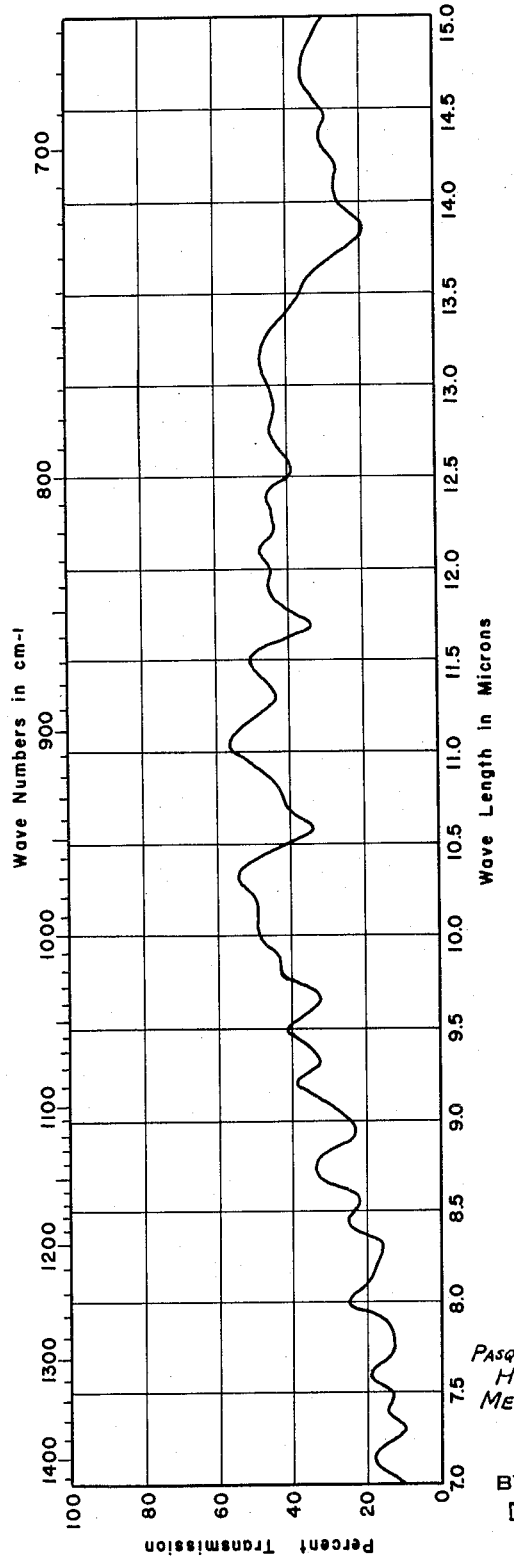

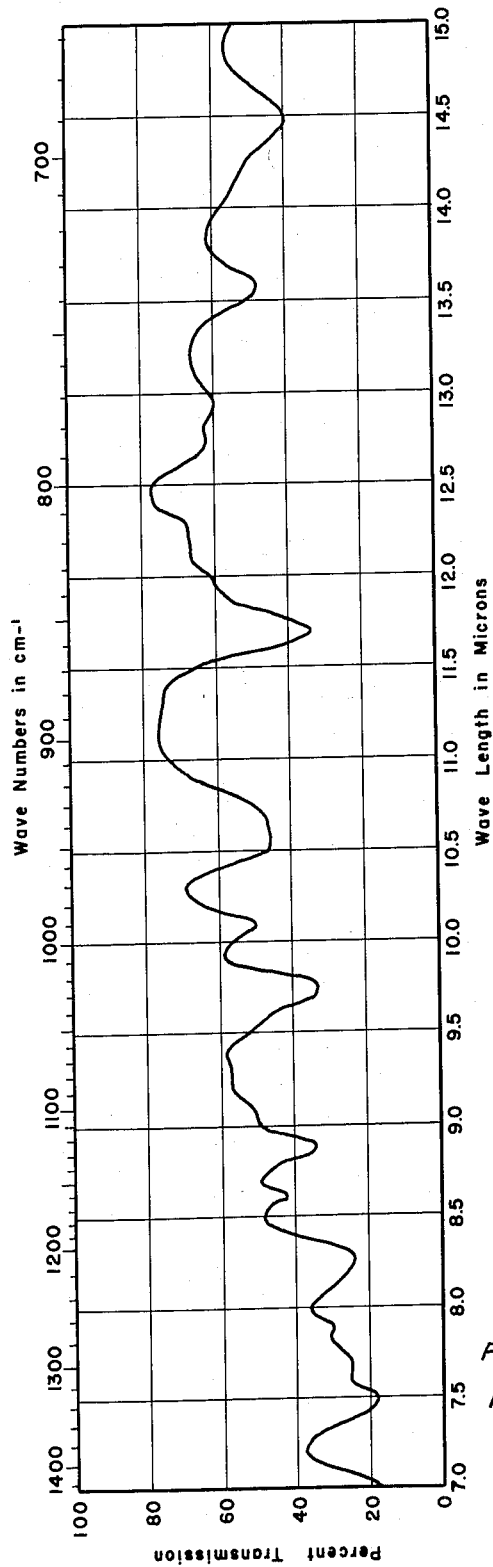

2,734,018
PROCESS FOR THE PREPARATION OF TETRACYCLINE AND CHLORTETRACYCLINE

Pasquale Paul Minieri, Brooklyn, N. Y., and Herman Sokol, Hasbrouck Heights, and Melvin C. Firman, West Windsor Township, N. J., assignors, by mesne assignments, to American Cyanamid Company, New York, N. Y., a corporation of Maine Application September 28, 1953, Serial No. 382,637

14 Claims. (Cl. 195—80)

The present invention relates to a new and therapeutically useful broad-spectrum antibiotic product, to its production by a fermentation and recovery process, and to particular steps of recovery and purification.

We have discovered that under proper process conditions (as exemplified in the following), including use of an organism of the species Streptomyces aureofaciens or a mutant of such an organism, there is produced in a fermentation broth and its crude product a high concentration of an antibiotic substance different from those known before, and different in particular from the substance chlortetracycline heretofore produced from organisms of that species; that under proper process conditions (also exemplified below) this substance can be formed in the fermentation broth and its crude concentrate with no material concomitant formation of chlortetracycline, and there can be recovered a new product containing this antibiotic substance in high concentration with little or even no detectable content of other antibiotic substance; and further that this product has properties which mark it as a new and useful therapeutic product likely to prove superior to known broad-spectrum antibiotics.

The newly discovered antibiotic substance of the present invention is now designated as tetracycline, and we include in that name either the form which is a free base or the form which is an acid or a basic salt.

We first produced this substance in good yield and relatively high concentration from a fermentation broth otherwise conventional but substantially free of chloride, using as the organism a strain of the species aureofaciens found in a soil sample obtained in Texas. We have since produced the substance in higher concentration using a mutant of that organism, designated UV-8, having distinctive characteristics; and we have reason to believe that further mutants of this or other organisms will permit production of this substance in high concentration in a broth containing a substantial content of chloride.

In the absence of a structure study, and on the basis of the properties and elemental analysis of the product, the substance contains in its molecule the structure that has been named tetracycine, and there is reason to believe that its molecular structure is that of tetracycline itself. The name tetracycline was first applied to the molecular portion common to aureomycin and terramycin (Brunings et al.; J. A. C. S., 74: 4976–4977, October 5, 1952); and later to a theoretical substance of which it was speculated that it might show antibiotic activity (Regna; Jour. N. Y. Acad. of Science, Ser. II, vol. 15, No. 1, pages 12–17, November 1952). The preparation of tetracycline by a catalytic hydrogenation of chlortetracycline referred to above has been reported recently (J. A. C. S., 75: 4621, 4622, September 20, 1953). The structure as there described is:

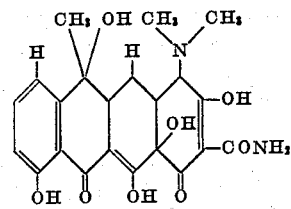

Prior to those publications or information of their contents we had produced our substance and had recognized its relation to but difference from either of the substances now designated as chlortetracycline and oxytetracycline. Its freedom from chlorine differentiated it at once from chlortetracycline, and its behavior in certain respects indicated a difference from oxytetracycline, which subsequent study has confirmed, despite a resemblance in other respects.

The antibiotic substance is an amphoteric substance which forms salts with acids and bases. Its solubility in water varies with the pH, becoming greater as the pH is raised or lowered from approximately 6.

The form which is least soluble in water at an intermediate pH is referred to as isoelectric, or amphoteric material or as free base. It has been found by in vitro tests that these acid and basic salts as well as the isoelectric material or free base are effective against a large number of bacteria including both gram positive and gram negative bacteria, such as: Staphylococcus aureus; Proteus vulgaris; Sarcina lutea; Klebsiella pneumoniae; Bacillus subtilis; Salmonella schottmulleri; Escherichia coli; Mycobacterium tuberculosis; Aerobacter aerogenes. Other bacteria are also affected in varying degrees as will be more fully shown.

The acid salts of tetracycline base may be readily prepared by dissolving the tetracycline free base in water or other suitable solvent acidified with an organic or inorganic acid, for example, hydrochloric acid, sulfuric acid or acetic acid. Similarly the basic salts may be readily formed by adding an organic or inorganic base, for example, sodium hydroxide, calcium hydroxide, organic amines or quaternary ammonium salts to a solution of the free base.

The new tetracycline product can be distinguished from previously known antibiotics in many ways. A chemical analysis of the free base shows that the antibiotic contains the following elements: carbon, hydrogen, nitrogen and oxygen (by difference). Since it does not contain sulfur or chlorine, it is distinguished from many others and particularly from chlortetracycline, which contains chlorine.

As is characteristic of many organic compounds, the properties of crystalline tetracycline are somewhat dependent upon the degree of purity and the manner in which the crystals are formed. When precipitated from solutions containing water, the free base precipitates as the trihydrate, which may be dried to the anhydrous form. Normally the free base is used in the trihydrate form, as the anhydrous form is quite hygroscopic and hydrates readily in the presence of moisture.

Crystals of tetracycline free base trihydrate were examined crystallographically and were found to belong to the orthorhombic system. These crystals exhibited the following optical characteristics:

Refractive indices:
  alpha=1.572±0.005
  beta=1.646±0.005
  gamma=greater than 1.750
Sign of birefringence is positive
Dispersion: red greater than violet
Optic axial angle:
  2E is less than 50° (25° to 50°)
  2V is therefore 14° to 27°
Interference figure: Visible in view exhibiting gamma and beta values. Acute bisectrix is parallel to vibration direction of gamma
Optic axial plane is perpendicular to the vibration direction of beta.

The optical rotation of highly pure crystalline tetracycline free base in methanol was determined.
$(\alpha)_D^{29°\,C.} = -234°$ (0.82% in methanol).

The precise solubility of tetracycline free base, as is the case with most antibiotics, is closely related to the degree of purity. In Table I are listed approximate solubilities of tetracycline free base trihydrate of high purity in various organic solvents.

TABLE I

| Solvent: | Solubility in 100 ml. |
|---|---|
| Methanol | at least 3 g. |
| Ethyl acetate | 25 mg. |
| Chloroform | 20 mg. |
| Water | less than 10 mg. |
| Benzene | less than 10 mg. |
| Diethyl ether | less than 10 mg. |

The melting point of anhydrous crystalline tetracycline free base, as for many other organic materials, depends to a certain extent on a number of factors including the degree of purity and the manner in which the crystals are heated. Crystals of highly pure anhydrous free base on a microscope slide were placed on a hot stage at 100° C. The temperature was increased at the rate of 2° C. per minute until a temperature of 145° C. was reached and then at 1° C. per minute until the crystals melted. When heated under these conditions, the melting point was in the range of 160°-168° C. with decomposition. If the stage is heated to 155° C. initially and the temperature of the sample is increased at the rate of 1° C. per minute, the substance melts over a somewhat narrower range. While these crystals were not absolutely pure, it is believed that this range is characteristic.

A sample of the trihydrate in a capillary melting point tube was placed with a thermometer in a test tube containing Dow-Corning Silicone No. 200 at 150°-155° C. This test tube was immersed in a bath of the same material at 160°-165° C., which was then heated with stirring so that the temperature rose 1°-2° C. per minute. The sample expanded slowly when the inner tube temperature rose to 160°-165° C. There was no darkening but a yellow color developed. When the temperature reached 170°-175° C., darkening started to take place. This became more pronounced with a further increase in temperature. When a sample of the anhydrous free base was subjected to the same treatment, similar results were obtained.

The optical rotation of a solution of highly pure tetracycline hydrochloride crystals in water was determined.
$(\alpha)_D^{29°\,C.} = -283°$ (0.65% in water).

The ultra-violet absorption of both the free base and the hydrochloric acid salt of tetracycline was determined by measuring the optical densities of methanol solutions versus a methanol blank at various wave lengths (Beckman quartz spectrophotometer—model DU). A solution of 1.0 mg. of the free base in 50 ml. of methanol gave the following maximum and minimum values:

$E_{1\,cm.}^{1\%}$ at 235 mu = 188

$E_{1\,cm.}^{1\%}$ at 269 mu = 271

$E_{1\,cm.}^{1\%}$ at 298.5 mu = 128

$E_{1\,cm.}^{1\%}$ at 365 mu = 272

The ratio of $E_{1\,cm.}^{1\%}$ at 269 to that at 365 is 1.00 and is characteristic of the purified antibiotic.

A solution of 1.10 mg. of tetracycline hydrochloride in 50.0 ml. of methanol gave the following maxima and minima:

$E_{1\,cm.}^{1\%}$ at 234 mu = 179

$E_{1\,cm.}^{1\%}$ at 270 mu = 301

$E_{1\,cm.}^{1\%}$ at 298.5 mu = 131

$E_{1\,cm.}^{1\%}$ at 363 mu = 274

The ratio of $E_{1\,cm.}^{1\%}$ at 270 to that at 363 is 1.10 and is characteristic of the antibiotic.

A suspension obtained by mulling crystals of tetracycline in a neutral mineral oil shows many characteristic absorption bands in the infrared region of the spectrum. The infrared absorption spectrum of the free base, within the characteristic fingerprint region of the spectrum, is shown in Figure 1 of the accompanying drawings. The location of the characteristic absorption bands are as follows, all values being rounded to the nearest five hundredths:

| | |
|---|---|
| 7.3 microns | 11.3 microns |
| 7.5 microns | 11.7 microns |
| 7.8 microns | 12.0 microns |
| 8.3 microns | 12.2 microns |
| 8.55 microns | 12.55 microns |
| 8.9 microns | 12.9 microns |
| 9.3 microns | 13.85 microns |
| 9.65 microns | 14.2 microns |
| 10.6 microns | 14.45 microns |

The infrared absorption spectrum of the hydrochloride salt in a neutral mineral oil mull is shown in Figure 2. The locations of the characteristic absorption bands in the characteristic fingerprint region of the spectrum are as follows, all values being rounded to the nearest five hundredths:

| | |
|---|---|
| 7.0 microns | 10.1 microns |
| 7.5 microns | 10.6 microns |
| 7.7 microns | 11.7 microns |
| 7.9 microns | 12.75 microns |
| 8.25 microns | 12.95 microns |
| 8.6 microns | 13.6 microns |
| 8.9 microns | 14.5 microns |
| 9.75 microns | |

The new tetracycline product can be distinguished from other antibiotics including antibiotics produced by microorganisms which are species of Streptomyces by means of Craig countercurrent distribution studies. This technique is described in Craig, L. C., Journal of Biological Chemistry, volume 150, page 33 (1943). For example, when tetracycline is distributed in a 49-plate Craig apparatus using the system n-butanol −2.5% aqueous acetic acid, the highest concentration of tetracycline is in tube 18. Utilizing the same system, the highest concentration of chlortetracycline is in tube 28, the highest concentration of chloramphenicol in tube 47, and the highest concentration of oxytetracycline is in tube 16. These studies were made at room temperature. The relation to oxytetracycline is close, but the consistency of results shows that the difference of two plates is significant.

The slope dose response curve is another aid in differentiating various antibiotics. For pure antibiotics, the size of the zone of inhibition for a given concentration varies with the different antibiotics. The size of the zone produced by a known amount of any one antibiotic at various pH values of the medium is known to be characteristic of the antibiotic and related to a certain extent to the acidic or basic properties of the antibiotic. For example, basic antibiotics like streptomycin produce larger zones of inhibition at pH 8 than pH 6. In contradistinction, an acidic antibiotic such as penicillin produces a larger zone at pH 6 than at pH 8. Chloramphenicol, which is a neutral antibiotic, produces zones of inhibition which are relatively constant in size regardless of pH. Oxytetracycline and chlortetracycline are amphoteric antibiotics, but each of these produces larger zones of inhibition at pH 6 than at pH 8. The following is a comparison of the sizes of the zones of inhibition produced by 10 mcg./ml. of each of the antibiotics on agar plates seeded with *S. lutea*.

|  | pH 6 | pH 7 | pH 8 |
|---|---|---|---|
| Tetracycline | 24.7 | 19.7 | 13.6 |
| Chlortetracycline | 29.2 | 23.5 | 13.2 |
| Chloramphenicol | 18.2 | 17.5 | 18.8 |
| Oxytetracycline | 24.1 | 19.8 | 15.6 |
| Thiolutin | 28.7 | 27.7 | 27.0 |

While tetracycline resembles chlortetracycline and oxytetracycline, it is significantly different from either of them as shown by the difference in rate of change of zone size with pH.

Tetracycline can also be distinguished from oxytetracycline or chlortetracycline by means of the Ehrlich reagent. In carrying out this test, a solution of each of the three antibiotics was made up at the concentration of 5 mg. in 5 ml. of 1.2 N hydrochloric acid. Then one milliliter of a 2% (w./v.) solution of p-dimethylaminobenzaldehyde in 1.2 N hydrochloric acid was added to each solution and allowed to stand overnight. The solution of chlortetracycline turned canary yellow, while in the oxytetracycline solution a bluish-green precipitate formed with a similarly colored supernatant. The tetracycline solution turned a deep yellow with a trace of orange. When both the reagent and 5 mg. of chlortetracycline were added to the above solution of oxytetracycline, a bluish-green precipitate and supernatant were obtained just as upon the addition of the reagent alone. However, when both the reagent and 5 mg. of tetracycline was added to the oxytetracycline solution, there was no precipitate and no color change.

Tetracycline can be further differentiated from both chlortetracycline and oxytetracycline by the difference in color in the presence of sulfuric acid. When chlortetracycline is dissolved in concentrated sulfuric acid (approximately 25 mg./ml.) a purple solution is formed which changes after a few seconds to greenish-black. When oxytetracycline is dissolved in the same concentrated sulfuric acid, a stable characteristic cherry-red solution is obtained (Monastero, F., et al., Journal of American Pharmaceutical Association, Scientific Ed., 40: 241–245, May 1951). However, when tetracycline is dissolved in the same acid, the solution has a stable violet color.

The antibacterial spectrum, representing the amount of antibiotic required to inhibit the growth of various typical bacteria, is characteristic of the antibiotic and is another aid in distinguishing the antibiotic as well as being indicative of the organisms against which the antibiotic is effective. Table I shows the relative amounts in mcg./ml. of tetracycline trihydrate, chlortetracycline hydrochloride, oxytetracycline hydrochloride and chloramphenicol required to inhibit a number of representative organisms. The method used was the agar-dilution streak method of Waksman and Reilly (Ind. Eng. Chem. Anal. Ed. 17: 556–558, 1945). These data show that tetracycline is a broad spectrum antibiotic. As is known, the more significant matter from the standpoint of differentiation between two substances is the relationship among the several inhibition values for each, rather than a direct comparison of the inhibition values of the two for any one organism. In this respect, the data present a significant difference in the case of tetracycline and mark it as a distinct antibiotic substance.

TABLE II

*Antibacterial spectrum*

| Test Organism | A | B | C | D |
|---|---|---|---|---|
| Staphylococcus aureus PCI 209-P | 0.292 | 6.25 | 0.39 | 0.58 |
| Staphylococcus aureus PCI 1248-A | 0.39 | 6.25 | 0.78 | 0.78 |
| Streptococcus pyogenes ATCC 8668 | 0.29 | 1.17 | 0.24 | 0.24 |
| Streptococcus mitis ATCC 6249 | 0.147 | 2.34 | 0.147 | 0.292 |
| Streptococcus fæcalis ATCC 7080 | 0.39 | 6.25 | 0.78 | 1.95 |
| Micrococcus flavus PCI 16 | 0.292 | 1.56 | 0.39 | 0.39 |
| Diplococcus pneumoniæ ATCC 6301 | 0.098 | 2.34 | 0.147 | 0.292 |
| Sarcina lutea ATCC 9341 | 0.147 | 1.56 | 0.39 | 0.39 |
| Bacillus subtilis ATCC 6633 | 0.195 | 6.25 | 0.39 | 0.39 |
| Escherichia coli ATCC 9637 | 1.45 | 12.5 | 1.17 | 1.17 |
| Klebsiella pneumoniæ PCI 602 | 0.29 | 1.17 | 0.58 | 0.58 |
| Aerobacter ærogenes ATCC 8508 | 1.17 | 3.12 | 2.34 | 1.56 |
| Proteus vulgaris ATCC 6380 | 4.6 | 3.12 | 3.9 | 3.12 |
| Pseudomonas æruginosa ATCC 9027 | 25.0 | >100 | 25.0 | 14.0 |
| Salmonella schottmulleri | 3.12 | 3.12 | 2.34 | 3.12 |
| Salmonella typhosa | 1.17 | 4.6 | 2.34 | 1.56 |
| Brucella bronchiseptica ATCC 4617 | 0.292 | 6.25 | 0.78 | 1.17 |
| Mycobacterium tuberculosis ATCC 607 | 0.147 | 6.25 | 0.195 | 0.29 |
| Mycobacterium friedmanii ATCC 114 | 0.122 | 6.25 | 0.24 | 0.292 |
| Mycobacterium smegmatis ATCC 361 | 0.073 | 12.5 | 0.147 | 0.292 |
| Mycobacterium smegmatis ATCC 10143 | 0.073 | 6.25 | 0.147 | 0.122 |
| Mycobacterium sp. ATCC 9820 | 0.58 | 6.25 | 0.58 | 2.34 |
| Candida albicans ATCC 10231 | >100 | >100 | >100 | >100 |

A = Chlortetracycline hydrochloride.
B = Chloramphenicol.
C = Tetracycline.
D = Oxytetracycline hydrochloride.

Fermentation

Tetracycline is produced by fermentation using a microorganism exemplified by one newly isolated from a soil sample collected in the State of Texas and by various organisms of the same species. It also is produced by mutants, some of which have developed characteristics not typical of the species. The Texas organism belongs to the species *Streptomyces aureofaciens* described in Duggar Patent No. 2,482,055—"Aureomycin and Preparation of Same." Viable cultures of the organism isolated from Texas soil and originally designated by us as HA–20 have been deposited in the American Type Culture Collection, 2029 M Street Northwest, Washington 6, D. C., and have been given their accession number ATCC 12416–a. Cultures of a single colony variant isolated from the Texas organism HA–20, designated by us as T–5, and cultures of an ultraviolet derived mutant strain from culture T–5, desginated by us as UV–8, have also been deposited with the American Type Culture Collection and have been given their accession numbers ATCC 12416–b and ATCC 12416–c, respectively. Subcultures of these microorganisms may be obtained by qualitfied investigators for research purposes from the American Type Culture Collection upon request.

Table III sets forth the cultural characteristics of two isolates derived from the Texas culture which have been used in the production of tetracycline. These characteristics are identical with those exhibited by a known culture of S. aureofaciens.

TABLE III

| | |
|---|---|
| Glucose broth | Yellowish growth settled on the bottom, acid reaction. |
| Lactose broth | Yellowish growth settled on the bottom, no acid reaction. |
| Glycerin broth | Yellowish growth settled on the bottom, no acid reaction. |
| Sucrose broth | Yellowish growth settled on the bottom, acid reaction. |
| Litmus milk | Surface growth, slight clearing, no pH change. |
| Gelatin stab | Growth good at the surface, no liquefaction, yellow pigment. |
| Asparagine-meat extract agar | Slight yellow pigment, good growth, aerial hyphae, white becoming grey. |
| Czapek-Dox agar | Poor growth, flat colorless mycelium, no aerial hyphae, no soluble pigment. |
| Emerson agar | Heavy growth, brownish mycelium, no aerial hyphae, back brownish slight soluble brown pigment. |
| Nutrient glucose agar | Same as Emerson. |
| Glycerin asparagine agar | Growth heavy, white aerial hyphae turning grey, back greenish yellow, slight soluble yellow pigment. |
| Starch agar | Flat colorless mycelium, no aerial hyphae, no soluble pigment, hydrolysis. |
| Calcium malate agar | Growth heavy, aerial hyphae white turning grey, pigment brownish. |

The strains, variations or mutants of *Streptomyces aureofaciens* which are preferred are those which produce relatively high yields of tetracycline in the fermentation broth, particularly those which will produce more than 500 mcg./ml. An example is an organism, UV-8, which is a mutant of the Texas microorganism. This mutant is a new strain which produces such yields in the fermentation medium and is a strain not described heretofore. Strain UV-8, when grown on Waksman agar (Journal Bacteriology: 7: 339-341, 1952) exhibits heavy mycelial growth which is off-white at first, becoming yellow and which is gradually covered with a powdery white aerial mycelium, which later sporulates. Old slants exhibit a jet-black coloration with small patches of white mycelium. This black growth, which has not heretofore been reported in cultures of *S. aureofaciens* and is not a characteristic of the species, consists of a mass of bodies in short chains which are easily disrupted. These bodies are variable in size and shape, ranging approximately from 0.5 up to 4.5 mu and varying in shape from oval to slightly angular globose-spherical. The average size is somewhat greater than those in *S. aureofaciens* (NRRL-2209) and there is greater variation in size and shape.

The present invention is not limited to UV-8 or any particular organism but includes any *S. aureofaciens* organisms or variant or mutant, either naturally occurring or artificially induced, which produces tetracycline in concentrations making possible the recovery of the therapeutic product.

We have found that during the fermentation, it is desirable to grow the organism under submerged conditions with suitable aeration and agitation, as, for example, in a flask on a shaking machine or in a stirred fermentor equipped with a sparger for inducing a stream of air continuously. The temperature does not appear to be critical within the range of 25°-35° C. although the range of 30°-33° C. is preferable. The initial pH of the medium should be close to neutrality, although some of the antibiotic is produced in media with initial pH values as low as 5.0 or as high as 8.5.

A fermentation medium suitable for the production of tetracycline contains a source of carbon, such as an assimilable carbohydrate, a source of assimilable nitrogen, inorganic salts such as phosphates, magnesium salts, etc. and sources of the usual minor elements. Buffers are usually included and where necessary, antifoaming agents.

The carbon source may be either a soluble carbohydrate such as sucrose or an insoluble one such as starch, for example, corn starch. Dextrin may also be used. Although sucrose, a soluble sugar, is quite satisfactory, lactose and glucose, two other soluble sugars, are relatively poor. The amount of carbon source may vary widely from about 0.5 to 10.0% by weight of the total weight of the fermentation medium.

As a source of assimilable nitrogen the inorganic ammonium salts are suitable. Among these are ammonium sulfate, ammonium phosphate, etc. It is also possible to use organic sources of nitrogen such as the amino acids and various proteinaceous natural materials.

Included among the inorganic salts found advantageous are phosphates which may be present either as ammonium phosphate or as metallic phosphate such as potassium phosphate, magnesium sulfate and a source of potassium if this is not already present, for example as potassium phosphate.

It is necessary to provide a source of the heavy metals usually referred to as minor elements unless they are present in the small amounts necessary in the other ingredients. Among these trace elements which may be present as impurities or added are copper, zinc, manganese, iron and chromium.

Among the buffering agents are calcium carbonate and salts of organic acids such as the citrates, acetates and lactates which are useful in maintaining the pH within the proper range. In addition, the organic acids may serve as sources of carbon in the metabolism of the microorganism. The use of a defoaming agent is desirable in large scale fermentors, even though in this fermentation foaming is not a particularly difficult problem and is readily controlled by the use of conventional defoaming agents such as octadecanol in lard oil or other suitable commercial defoamer.

In the use of microorganisms of *S. aureofaciens*, which in their original use produced the antibiotic now called chlortetracycline, tetracycline is produced in high concentration when the available chloride ion in the fermentation medium is minimized. There is some concomitant formation of chlortetracycline if any substantial amount of available chloride ion is present, and to recover a product free of chlortetracycline in that case it is then necessary to employ selective recovery steps which exclude that substance from the recovered product. Any special step in that direction can be avoided if the content of available chloride ion in the fermentation medium is maintained at a level of the order of one part per million. It is possible to have a higher level, still less however than is present in the conventional fermentation media for the production of chlortetracycline as the desired end product; and we contemplate for our process contents of available chloride ion which result in the formation of an amount of chlortetracycline in the broth up to approximate equality with the formation of tetracycline. As a working rule, one part per million of available chloride ion can produce at most 14 mcg./ml. of chlortetracycline; from which one can calculate for any case the permissible chloride ion content in relation to the ascertained yield of total *E. coli* antibacterial activity.

There are various ways of controlling the chloride ion content. One way is to sequester the chloride in an inactive complex. We prefer to use methods which exclude chloride ion from the fermentation medium. Successful results have been obtained by the use of distilled water and the use in the medium of constituents which do not contain chloride. So-called synthetic media, of which examples are given below, serve that purpose. Many natural materials often used in fermentation media contain chloride. Their use is possible nevertheless if they are first deionized by treatment with ion exchangers or other suitable means of removing chloride ion.

We have devised a synthetic medium which is substantially free of chloride, which produces superior yields, is easy to prepare, is lower in cost and is consistent in composition. This medium in general contains sucrose as the carbohydrate, ammonium sulfate as a nitrogen source, potassium phosphate as an inorganic salt, magnesium sulfate, calcium carbonate, sodium citrate and acetic acid as buffering agents and copper sulfate, zinc sulfate and manganese sulfate in small quantities as sources of trace elements. Substantially chloride-free grades of these materials are selected, and distilled water is used, so that this medium contains not more than 1 p. p. m. of chloride.

Useful composition is:

| | |
|---|---|
| Sucrose | 30 g./l. |
| $(NH_4)_2SO_4$ | 8.1 g./l. |
| $Na_3C_6H_5O_7 \cdot 5H_2O$ | 8.1 g./l. |
| $MgSO_4 \cdot 7H_2O$ | 0.25 g./l. |
| $K_2HPO_4$ | 0.57 g./l. |
| $CaCO_3$ | 1.0 g./l. |
| $CH_3COOH$ | 0.1 ml. |
| $CuSO_4 \cdot 5H_2O$ | 3 p. p. m. |
| $ZnSO_4 \cdot 7H_2O$ | 50 p. p. m. |
| $MnSO_4 \cdot 4H_2O$ | 2.5 p. p. m. |

Inoculum for fermentation may be prepared from growth obtained on slants inoculated with the *S. aureofaciens*. A suitable medium for the slants is Waksman agar having the following composition:

| | Grams per liter |
|---|---|
| Glucose | 10 |
| Peptone | 5 |
| $KH_2PO_4$ | 1 |
| $MgSO_4 \cdot 7H_2O$ | 0.5 |
| Agar | 20 |

The slant growth may be transferred to shaker flasks which may be used as small scale laboratory fermentors or for the production of inoculum for inoculating larger fermentations.

For large scale tank fermentation, the slant growth is used to seed a suitable liquid medium in shaker flask which is shaken on a reciprocating shaking machine at temperatures ranging from 26°–35° C., preferably at 30°–33° C. A second shaker-flask stage is usually employed in conjunction with submerged tank fermentations in order to increase the volume of the shaken inoculum equal to 1.5% to 2.5% of the liquid volume in the tank. The reaction of the shaker flask medium is within the range of pH 6.5 to 7.5 initially and, as growth occurs, a continuous drop in the pH value is observed with values as low as 3.8 being recorded. However, a physiological age as indicated by a pH value of 5.0 is apparently the most favorable period for transferring the inoculum.

The shaker inoculum, equal to 1.5% to 2.5% of the liquid volume in the tank, is aseptically transferred to the fermentor and grown for about 2 to 3 days with continuous agitation and aeration. Air rates equal to 0.5 to 1.5 volumes of free air per volume of liquid medium may be used depending upon the size of the fermentor. Foaming of the broth can be controlled by the sterile addition of an antifoam agent as lard oil containing 2% octadecanol.

Recovery

In the recovery of tetracycline from the fermentation broth, it is possible to employ conventional practices developed in connection with other antibiotics, such as the known solvent extractions, with or without carriers, or adsorptions. Of known solvents, such as butanol, ethyl acetate and chloroform, the use of which involves subsequent purification steps, butanol is best for the extraction of tetracycline. These known procedures are applicable with fair success in the case of fermentation broths in which little antibiotic substance other than tetracycline is formed, where the objective is simply to effect a separation between the total antibiotic content and the inactive materials ordinarily classed as impurities. In the case where there is a substantial formation of antibiotic substance other than tetracycline, as when the chloride ion level is not kept to a minimum and there is substantial formation of chlortetracycline, these known methods are less effective if it is desired to recover the tetracycline in high concentration in the end-product, omitting other antibiotic substances. (We refer here to antibiotics as substances antagonistic to *E. coli*.)

We have devised a novel recovery method which is highly effective in either case mentioned above, and highly effective both from the standpoint of recovering a product free of inactive impurities and from the standpoint of recovering a product free of other antibiotic substances concomitantly formed in the broth. This improved method yields a crystalline product of high purity from both standpoints. This method is exemplified below. In its main features, it involves using a particular group of quaternary ammonium salts selectively precipitating tetracycline from the broth, at an alkaline pH (pH 8 to 11) as the quaternary ammonium salt of tetracycline. This salt, after filtration, is then slurried with a small amount of water and a relatively large amount of chloroform, whereby the quaternary ammonium salt of tetracycline is dissolved in the chloroform phase of the slurry. The water and chloroform phases are then preferably separated to remove any impurities dissolved in the water. The tetracycline is then extracted with an aqueous acid solution at a pH of about 1 to 2.5, with formation of the acid salt of tetracycline which goes into solution in the water phase, from which it precipitates as a crystalline product upon increase of the pH to the range from 3 to 7, precipitation starting at the lower value.

The quaternary ammonium salts that are particularly useful in this recovery method are alkyl trimethylammonium chlorides and dialkyl dimethylammonium chlorides wherein the alkyl group contains from 8 to 18 (inclusive) carbon atoms.

The following Examples I to IV are given to illustrate the production of tetracycline by fermentation under submerged areobic conditions. The same media may be used for fermentation in shaker flasks on a smaller scale or in tanks on a larger scale. Examples V to IX illustrate the recovery of tetracycline.

EXAMPLE I

A corn steep liquor medium was prepared in the following manner. Corn steep liquor of approximately 50% solids content (w./v.) was diluted with distilled water to give a final concentration of 2%. The resulting diluted material was passed through a column packed with 30 liters of a mixture consisting of 2 volumes of Amberlite IR45, an anionic exchange resin, and 1 volume of Amberlite IRC50, a cationic exchange resin. Collection of the effluent did not start until the resistivity had risen to 5,000 ohm-centimeters and continued until the resistivity had dropped below 3,000 ohm-centimeters. To 1,000 ml. of the deionized corn steep liquor solution there was added the following components for the preparation of a medium suitable for the propagation of inoculum and for the production of tetracycline to produce a medium containing about 17 p. p. m. of chloride, although a lower chloride content is preferred:

| | | |
|---|---|---|
| Sucrose | grams | 30.0 |
| $K_2HPO_4$ | do | 15.0 |
| $(NH_4)_2HPO_4$ | do | 5.0 |
| $MgSO_4 \cdot 7H_2O$ | do | 2.0 |
| $CaCO_3$ | do | 1.0 |
| KBr | do | 0.5 |
| $ZnSO_4 \cdot 7H_2O$ | do | 0.05 |
| $CuSO_4 \cdot 5H_2O$ | milligrams | 3.0 |
| $MnSO_4 \cdot 4H_2O$ | do | 2.5 |

For the preparation of an inoculum, 50-milliliter volumes of the above medium were distributed into 250-milliliter Erlenmeyer flasks and 400-milliliter volumes into 2-liter flasks. A dry loopful of spores from the surface growth of the tetracycline organism grown on slanted semi-solid medium was used to seed the 50-milliliter volumes which were shaken at 30° C. for 72 hours on a reciprocating shaking machine (82 strokes per minute with a 2⅞ inch displacement). At the end of this time 1.0 ml. of the resulting mycelial suspension was used to inoculate 400 ml. of medium which was shaken for an additional 28 hours. Four 400-ml. volumes were pooled aseptically and used to seed the fermentor.

The fermentation medium was prepared in 25-gallon fermentors as follows: The components, at the concentrations described above were dissolved in 11.5 gallons of the deionized corn steep liquor solution for a final total volume of 15.8 gallons. The medium was sterilized at 121° C. by injecting steam at 15 p. s. i. gauge directly into the batch for 30 minutes. The volume gained from the steam condensate provided the required difference between the initial 11.5 gallons of deionized corn steep liquor-sugar-salts solution and of the final 15.8 gallons required. Upon cooling to 30° C., the mixture was seeded with the four pooled 400-ml. volumes of inoculum previously described, agitated and aerated at a rate of 1.6 volumes of air per volume of medium for 38 hours. At this time the reaction of the broth which was initially at pH 5.9 had dropped to 4.1. The broth assayed 20 mcg./ml. of antibiotic, using oxytetracycline as a standard and contained a substantial amount of tetracycline.

EXAMPLE II

For the preparation of of the inoculum the following synthetic medium was used:

| | |
|---|---|
| Sucrose _____grams__ | 30.0 |
| Sodium citrate _____do____ | 1.0 |
| Ammonium sulfate _____do____ | 3.3 |
| MgSO$_4$·7H$_2$O _____do____ | 0.25 |
| K$_2$HPO$_4$ _____do____ | 0.10 |
| KH$_2$PO$_4$ _____do____ | 0.10 |
| CaCO$_3$ _____do____ | 1.0 |
| ZnSO$_4$·7H$_2$O _____do____ | 0.04 |
| MnSO$_4$·4H$_2$O _____do____ | 0.01 |
| K$_2$Cr$_2$O$_7$ _____milligram__ | 0.016 |
| Acetic acid _____milliliter__ | 0.4 |

Distilled water was used to bring the volume to 1,000 ml. The materials were selected to be substantially free of chloride and the medium contained about 1 p. p. m. of chloride.

The above medium was distributed in 400-ml. aliquots into 2-liter Erlenmeyer flasks and sterilized for 30 minutes at 121° C. and 15 p. s. i. gauge steam pressure. Upon cooling, the flasks were inoculated with a suspension of spores of the tetracycline organism and incubated 72 hours on a reciprocating shaker at 33° C., at which time the pH dropped to 5.0 and a soluble orange-yellow pigment was produced. Four 2-liter flasks containing 400 ml. of the above-mentioned medium were then seeded with 10.0 ml. of the first generation inoculum and grown for 24 hours on a shaking machine, after which time they were pooled and aseptically introduced into the fermentor.

The fermentation medium consisted of the following reagent grade materials:

| | |
|---|---|
| Sucrose _____grams__ | 40.0 |
| Sodium citrate _____do____ | 2.0 |
| Ammonium sulfate _____do____ | 3.3 |
| MgSO$_4$·7H$_2$O _____do____ | 0.25 |
| K$_2$HPO$_4$ _____do____ | 0.1 |
| KH$_2$PO$_4$ _____do____ | 0.1 |
| CaCO$_3$ _____do____ | 1.0 |
| ZnSO$_4$·7H$_2$O _____do____ | 0.04 |
| MnSO$_4$·4H$_2$O _____do____ | 0.01 |
| K$_2$Cr$_2$O$_7$ _____milligram__ | 0.016 |
| Acetic acid _____milliliter__ | 0.2 |

Distilled water was used to bring the final volume to 1,000 ml.

Sixty liters of the above medium containing about 1 p. p. m. of chloride was made up in a 25-gallon stainless steel fermentor and sterilized for 30 minutes at 121° C. and 15 p. s. i. steam pressure. After cooling to the operating temperature of 30° C., the batch was seeded with a 24-hour old shaker flask inoculum equal to 2.7% of the batch volume, agitation provided and air sparged at a rate of 1.6 volumes of air per volume of liquid per minute. After 40 hours, the pH of the medium, which was initially 6.9, had dropped to 3.85, and the broth had a potency of 53 mcg./ml. which consisted largely of tetracycline.

EXAMPLE III

Fifty gallons of the inoculum medium described in Example I were made up in a 125-gallon stainless steel inoculum tank and sterilized for 30 minutes at 121° C. The temperature was brought down to 33° C. and the batch seeded with 400 ml. of a 72-hour old shaker flask inoculum grown in the same medium. The tank was aerated with 1.0 volume of air per volume of medium and agitated for a period of 20 hours, at which time a pH of 5.05 was attained and the broth used to seed a fermentor.

The fermentation medium, of very low chloride content, had the following composition:

| | |
|---|---|
| Sucrose _____grams__ | 40.0 |
| CaCO$_3$ _____do____ | 1.0 |
| MgSO$_4$·7H$_2$O _____do____ | 0.25 |
| KH$_2$PO$_4$ _____do____ | 0.10 |
| K$_2$HPO$_4$ _____do____ | 0.10 |
| (NH$_4$)$_2$SO$_4$ _____do____ | 3.3 |
| Sodium citrate _____do____ | 2.0 |
| ZnSO$_4$·7H$_2$O _____do____ | 0.04 |
| MnSO$_4$·4H$_2$O _____do____ | 0.01 |
| K$_2$CrO$_7$ _____milligram__ | 0.016 |
| Acetic acid _____milliliter__ | 0.5 |

Distilled water was used to bring the final volume of 1,000 ml.

Six hundred gallons of the above medium was made up in a 1,000-gallon stainless steel tank and sterilized for 25 minutes at 121° C. Upon cooling to 30° C., the 50 gallons of the previously described contents of the inoculum tank was introduced aseptically and the entire contents agitated and aerated at the rate of 0.68 volume of air per volume of medium per minute for a period of 71 hours at which time the broth showed a potency of 92 mcg./ml.

EXAMPLE IV

The medium for inoculum was prepared (50 ml. in 250-ml. Erlenmeyer flasks) with the following ingredients:

| | |
|---|---|
| Sucrose _____g./l__ | 30 |
| Sodium citrate _____g./l__ | 1.0 |
| (NH$_4$)$_2$SO$_4$ _____g./l__ | 3.3 |
| MgSO$_4$·7H$_2$O _____g./l__ | 0.25 |
| KH$_2$PO$_4$ _____g./l__ | 0.10 |
| K$_2$HPO$_4$ _____g./l__ | 0.10 |
| CaCO$_3$ _____g./l__ | 1.0 |
| Acetic acid _____ml__ | 0.4 |
| Soy grits _____gram__ | 0.5 |
| Trace element solution _____ml__ | 1.0 |

Distilled water used to bring the final volume to one liter.

The solution of trace elements has the following composition:

| | |
|---|---|
| CuSO$_4$·5H$_2$O _____g./100 ml__ | 0.3 |
| ZnSO$_5$·7H$_2$O _____ | 5.0 |
| MnSO$_4$·4H$_2$O _____ | 0.25 |

(The pH was adjusted to 6.2 with NaOH.)

The materials were added in the order given and autoclaved. The flasks, after cooling, were inoculated from a slant of the UV-8 culture and shaken at 30°–33° C. for 48 hours on a reciprocating shaker (3.5-inch stroke and 97 cycles/minute).

For production of tetracycline the following medium was prepared:

Sucrose _____ 30 g./l. distilled water
$MgSO_4 \cdot 7H_2O$ _____ 0.25
$KH_2PO_4$ _____ 0.15
$CaCO_3$ _____ 1.5
Citric acid _____ 11.5
$NH_4OH$ _____ 10 ml.
Trace element solution_ 1.0 ml. (as previously described)

In each 250-ml. flask there was placed 50 ml. of the medium and after sterilization, 2.5 ml. of inoculum was transferred aseptically to each flask. The initial pH was in the range 6.0 to 7.0. After three days' incubation on a rotary shaker at 250 R. P. M. and 30° C. the assays in ten individual shaker flasks averaged 610 mcg./ml. against a tetracycline standard of 1,000 mcg./ml. for the pure material with *E. coli*. The assay against a tetracycline standard was 610 mcg./ml. With a chloride content of 0.6 P. P. M., the total potential amount of chlortetracycline produced was 8 mcg./ml. or about 1.4% of the total antibiotic.

EXAMPLE V

This is an example of recovery of tetracycline from a fermentation broth. To 155 gallons of broth prepared substantially as in Example II and assaying 68 mcg./ml. there was added 5600 grams of oxalic acid to solubilize the antibiotic. The pH was adjusted to 3.5 with 4600 ml. of concentrated ammonium hydroxide and the mixture filtered with 15 pounds of filter-aid to remove the mycelium and the precipitated calcium oxalate. Thirty gallons of a 5% solution of Emulsept (N-(lauroyl colamino formyl-methyl) pyridinium chloride, prepared by the Emulsol Corporation) in ethyl acetate was added to the filtered broth, and the mixture adjusted to pH 8.5 with 2200 ml. of 50% sodium hydroxide. The Emulsept acts as a carrier. The mixture was agitated 20 minutes and allowed to settle.

The ethyl acetate layer of 82 liters containing the antibiotic was separated and extracted three times using 1500 ml. of water and adjusting to pH 1.7 with hydrochloric acid each time. Sulfuric acid may be used. The extracts were pooled and adjusted to pH 7.8 with 6.5 ml. of 4 N ammonium hydroxide to form the relatively insoluble isoelectric material. The mixture was filtered and the cake dried in a vacuum desiccator. The weight of crude material was 21 grams; the assay was 417 mcg./mg. A countercurrent distribution of the material showed some 75% of the antibiotic present to be tetracycline.

EXAMPLE VI

In this example, 75 gallons of broth assaying 133 mcg./ml. was treated with 2700 grams of oxalic acid. The pH was adjusted to 3.5 with 2200 ml. of concentrated ammonium hydroxide. The mixture was filtered with the aid of 8 pounds of a filter aid, fifteen gallons of a 5% solution of Emulsept in ethyl acetate was added to the broth, and the mixture was adjusted to pH 8.5 with 1100 ml. of 50% sodium hydroxide. The mixture was agitated 20 minutes and allowed to settle.

The ethyl acetate layer (40 liters) was extracted four times, each with 400 ml. of water, and adjusting to pH 1.8 with hydrochloric acid each time. The extracts were pooled and adjusted to pH 7.8 with 4 N sodium hydroxide. The mixture was filtered and the cake dried. A weight of 41 grams assaying 302 mcg./mg. was obtained. According to countercurrent distribution, some 75% of the antibiotic activity present was tetracycline.

EXAMPLE VII

Fermentation broth containing more than 130 mcg./ml. of tetracycline was acidified to pH 3.5 with concentrated sulfuric acid to solubilize the antibiotic and filtered after the addition of a filter aid. The volume of filtered broth was 1070 gallons. To this broth there was added 2140 ml. of "Arquad 16," and the pH of the broth was brought up to 10.0 by the addition of 6100 ml. of 50% aqueous sodium hydroxide. ("Arquad 16" is a mixture of alkyl trimethylammonium chloride and dialkyldimethylammonium chloride in which the alkyl groups consist of 90% hexadecyl, 6% octadecyl, and 4% octadecenyl, in isopropanol. The alcohol constitutes about 50% of the preparation.) After the Arquad was added, the pH was adjusted to 8–11, to form the quaternary ammonium salts of tetracycline which precipitate out in this pH range. After the addition of 20 pounds of filter-aid, the broth was filtered and the solids thus obtained washed with water. Approximately four-fifths of this washed filter cake was slurried with 12 gallons of methanol solvent and sufficient concentrated hydrochloric acid added to bring the pH to 1.8, thereby increasing the solubility of the tetracycline. After stirring for 15 minutes the mixture was filtered and the solids washed with methanol until substantially free of color. The total volume of extract and wash was 92 liters. To the combined extract and wash there was added sufficient 10 N aqueous sodium hydroxide to bring the pH to 6.8, thereby forming the relatively insoluble free base which precipitated. The solids were filtered and air-dried. There was obtained 1545 grams of crude amorphous isoelectric tetracycline trihydrate assaying 296 mcg./mg.

EXAMPLE VIII

In a preferred recovery process, 2140 ml. of "Arquad 16" was added to 1070 gallons of filtered broth at pH 3.5 and the pH brought up to pH 10. Twenty pounds of filter-aid was added and the mixture was filtered and the solids washed with water. A one kilogram aliquot of the washed filter cake was slurried with 3300 ml. of chloroform and the pH adjusted to 10.5. This pH value may be in the range of 8–11. After stirring for 15 minutes, the solids were filtered and reslurried twice in succession with a mixture of 150 ml. water and 3300 ml. chloroform. The pooled chloroform extracts containing the antibiotic and from which the aqueous phase had been separated were then stirred with 600 ml. 0.4 N sulfuric acid and the pH adjusted to 2 with 4 N sulfuric acid. After 5 minutes' stirring, the aqueous phase was separated and filtered. A 340-ml. aliquot of this acid concentrate was adjusted to pH 5.3 and allowed to stand overnight in the refrigerator. The crystals were filtered, washed with ice water, and dried in vacuo over anhydrous calcium chloride. Nineteen and one-half grams assaying 629 mcg./mg. were obtained. There was no detectable amount of chlortetracycline present.

This recovery process is preferred as it is efficient in recovery and produces crystalline material. The filter cake comprising the precipitated quaternary ammonium salts of tetracycline is extracted with chloroform which is wet as a result of water in the chloroform or in the cake or as a result of being added. If chloroform is used under anhydrous conditions, lower yields are obtained. Preferably the filter cake is repeatedly extracted and the aqueous phase is preferably discarded. The chloroform extract is acidified with an inorganic acid to a pH preferably in the range of about 1–2.5 to convert the tetracycline salts to corresponding acid salts of tetracycline which are water soluble. Before or during addition of the acid water is added to form the two phases with the tetracycline acid salts in the aqueous phase. The aqueous phase is separated from the chloroform phase and the pH is raised to about 3 to 7 to form the relatively insoluble isoelectric material. Relatively low pH values are preferred, as purer crystals are obtained. The isoelectric material separates on standing as trihydrate crystals which can be separated readily by filtration and washed if desirable.

EXAMPLE IX

Two columns each containing 50 grams of "Amberlite IRC50" resin in the hydrogen cycle were buffered to pH 7 by passing through each at a rate of 10 ml./minute one liter of N sodium acetate-acetic acid buffer. "Amberlite IRC50" resin is a carboxylic cation exchange resin manufactured by Rohm and Haas. Ten liters of filtered broth assaying 41 mcg./ml. was adjusted to pH 7 with 4 N aqueous sodium hydroxide and passed through one of the buffered Amberlite IRC–50 columns at a rate of 5 ml./minute. The following fractions of effluent were collected:

0–2 liters assaying 13.3 mcg./ml.
2–5 liters assaying 8.7 mcg./ml.
5–7 liters assaying 15.1 mcg./ml.
7–10 liters assaying 25.0 mcg./ml.

The effluent from this column was passed through the second buffered column also at a rate of 5 ml./minute and fractions of effluent from the second column collected for assay.

0–2 liters assaying 16.9 mcg./ml.
2–4 liters assaying 12.4 mcg./ml.
4–6 liters assayings 7.5 mcg./ml.
6–10 liters assaying 7.2 mcg./ml.

One liter of N hydrochloric acid in 60% methanol was passed through the first column at a rate of 10 ml./minute. The eluate which contained 74% of the activity in the filtered broth was concentrated in vacuo to approximately one-third its volume when the pH had dropped to 2.5. The pH was brought to 1:8 by the addition of a filter aid in order to remove solids that separated during the concentration. The filtered solids were washed with water and the combined filtrate and washings brought to a pH of 7.8 by the addition of 4 N sodium hydroxide. The solids that separated were washed and then dried in vacuo. There was obtained 1.375 grams of product assaying 78 mcg./mg.

EXAMPLE X

Tetracycline can be precipitated from aqueous solution at an alkaline pH by the addition of a mixture of barium chloride and magnesium chloride. For example, when 15 grams of barium chloride dihydrate and 2 grams of magnesium chloride hexahydrate was added to a solution of 3 grams of crude tetracycline in one liter of water at pH 2.5 and then aqueous sodium hydroxide added to bring the pH to 8.5, all of the activity was found in the precipitate, which is separated by filtration from the liquor containing impurities. When this precipitate was slurried with water and the pH brought to 1.5 with sulfuric acid and the mixture filtered to remove the insoluble barium sulfate, the resulting aqueous extract contained practically all of the microbioligical activity originally present. This procedure may be used to concentrate tetracycline containing solutions and broths and to remove impurities.

EXAMPLE XI

Crystalline tetracycline hydrochloride may be prepared, for example, by dissolving one and one-half grams of crystalline tetracycline free base in a mixture of 3 ml. of normal hydrochloric acid and 12 ml. of water. The neutral antibiotic assayed 848 mcg./mg. One and one-half milliliters of n-butanol and 3 grams of sodium chloride were added. A few seed crystals of tetracycline hydrochloride were introduced and the mixture stirred for 4½ hours at room temperature. The crystals which were formed were separated by filtration, washed with ice cold filtrate and then dried over calcium chloride in a vacuum desiccator. The crystalline product weighed 1.26 grams.

EXAMPLE XII

Crystals of tetracycline free base were formed by dissolving crude amorphous tetracycline in water. This crude material assayed approximately 427 mcg./mg. The aqueous solution was adjusted to pH 3 by the addition of hydrochloric acid. The solution was then saturated with n-butanol and thereafter subjected to a countercurrent distribution with nine separatory funnels utilizing equal volumes of n-butanol saturated with water which had been adjusted to pH 3 with dilute hydrochloric acid. After distribution, the middle tubes 4, 5, 6 and 7 were combined and the pH brought up to 7 by the addition of dilute sodium hydroxide solution. This mixture was concentrated under a vacuum at 40–50° C. The crystals that formed upon cooling were separated by filtration and dried over calcium chloride in a vacuum desiccator. The crystalline trihydrate product thus obtained assayed 780 mcg./mg.

Assay of tetracycline

For the assay of tetracycline, *E. coli* 9637 and Difco Nutrient agar at pH 6.0 may be used to determine concentrations ranging from about 15 to 100 mcg./ml. *S. lutea* 9341 with Difco Penassay Seed agar adjusted to pH 6.0 is a more sensitive organism and may be used to determine concentrations ranging from about 5 to 50 mcg./ml. In all cases the dilutions were made in 0.1 M potassium phosphate buffer at pH 6.0 and applied in 0.1 ml. volumes to S and S No. 420E 12.5 mm. paper discs. All plates were incubated at 30° C. for 18 hours and zones of inhibition measured on a Quebec Colony Counter. Results may be read from a standard curve prepared on the same day, or a multiple dose method may be used. A sample of purified tetracycline was assigned an arbitrary value of 1,000 mcg./mg. on an anhydrous basis. All values reported have been calculated against this standard unless otherwise noted.

Toxicity

Antibiotic tetracycline shows little toxicity when administered to animals. Table IV shows the relative quantities of HA–20A, chlortetracycline and oxytetracycline required to kill mice following administration of a single dose by routes indicated. It is seen that the toxicity of tetracycline is comparable to those of chlorotetracycline and oxytetracycline.

TABLE IV

*Toxicities of antibiotics to mice*

| Route of Administration | Tetracycline, mg./kg. | Chlortetracycline, mg./kg. | Oxytetracycline, mg./kg. |
|---|---|---|---|
| Intravenous | $LD_{50}145$ | $LD_{50}140$ | |
| Intraperitoneal | $LD_{50}355$ | $LD_{50}365$ | $LD_{50}280$ |
| Subcutaneous | $LD_{20}400$ | $LD_{10}400$ | $LD_{20}340$ |
| Oral | $LD_{20}4250$ | | $LD_{20}3750$ |

Administration

Animal protection tests using mice infected with *D. pneumoniae*, *K. pneumoniae* and *Spyogenes* show that tetracycline, when administered subcutaneously or orally, has activity comparable to that of oxytetracycline and chlortetracycline.

Our new therapeutic product of the broad spectrum class of antibiotic has been prepared in a purity in excess of 95% and with a negligible content of antibiotic substance other than tetracycline. An alternative form of the product comprises a significant content, not exceeding about one-half, of other compatible antibiotic substance either added to the preparation or formed concomitantly in the fermentation broth and co-crystallized in the recovery step, as when the described butanol or Emulsept extraction procedure is employed. These products may be administered to humans and animals in the manner of known broad spectrum antibiotics, and in the conventional dosage forms appropriate to the desired route of administration.

We claim:
1. The process of producing tetracycline which comprises cultivating in a fermentation broth an organism chosen from the group consisting of organisms of the species Streptomyces aureofaciens together with natural and artificially induced mutants thereof, while inhibiting the formation of chlortetracycline by selecting nutrient elements making up the fermentation broth which are substantially free of soluble chlorides, and recovering therefrom a product containing tetracycline as the major antibiotic substance present in the product.

2. The process of producing tetracycline which comprises cultivating in a fermentation broth an organism chosen from the group consisting of organisms of the species Streptomyces aureofaciens together with natural and artificially induced mutants thereof, the broth being substantially free of available chloride ion.

3. The process of producing tetracycline which comprises cultivating in a fermentation broth an organism chosen from the group consisting of organisms of the species Streptomyces aureofaciens together with natural and artificially induced mutants thereof, the available chloride ion content of said broth being not over 10 parts per million.

4. The process of producing tetracycline which comprises cultivating in a fermentation broth an organism chosen from the group consisting of organisms of the species Streptomyces aureofaciens together with natural and artificially induced mutants thereof, the available chloride ion content being about 1 part per million.

5. A method of producing tetracycline in amounts of at least 500 micrograms per milliliter in a fermented liquor, which comprises the steps of fermenting aqueous nutrient medium containing no more than about 35 parts per million of chloride ions with an organism chosen from the group consisting of organisms of the species S. aureofaciens, together with natural and artificially-induced mutants thereof, said fermentation taking place at a temperature within the range 20–35° C. at a pH between about 3.5 and 7.5, the said medium containing a source of carbon, nitrogen, and mineral salts essential to fermentation of the medium and production of tetracycline.

6. A method of producing aqueous solutions containing at least 500 micrograms per milliliter of tetracycline and smaller amounts of chlortetracycline, which comprises the steps of inoculating an aqueous nutrient medium containing no more than about 35 parts per million of chloride ions with an organism chosen from the group consisting of organisms of the species S. aureofaciens, together with natural and artificially-induced mutants thereof and aerobically fermenting said aqueous medium until at least 500 micrograms per milliliter of tetracycline is contained in said fermented liquor.

7. A method of producing aqueous solutions containing at least 500 micrograms per milliliter of tetracycline, which comprises the step of inoculating an aqueous nutrient medium with an organism chosen from the group consisting of organisms of the species S. aureofaciens, together with natural and artificially-induced mutants thereof and aerobically fermenting said aqueous medium while restricting the supply of chloride ions in said aqueous liquor to an amount such that the number of micrograms of tetracycline produced at the end of the fermentation period divided by 14 is greater than the parts per million of chloride ions available to the fermentation and continuing said fermentation until at least 500 micrograms per milliliter of tetracycline is contained in said fermented liquid.

8. The process of causing organisms chosen from the group consisting of organisms of the species S. aureofaciens, together with naturol and artificially-induced mutants thereof to produce tetracycline during fermentation of an aqueous nutrient medium, which comprises aerobically-fermenting an aqueous nutrient medium in which the chloride ion content is restricted by formulating the medium with nutrient substances substantially free of soluble chlorides and continuing the fermentation until the tetracycline content of said liquor is at least 500 parts per million and is greater than the chlortetracycline present in said medium.

9. In a process of producing tetracycline which comprises aerobically fermenting an aqueous nutrient media in which the chloride ion content is controlled with an organism chosen from the group consisting of organisms of the species S. aureofaciens, together with natural and artificially-induced mutants thereof capable of producing both chlortetracycline and tetracycline, the steps of continuing said fermentation until the tetracycline produced exceeds the chlortetracycline also produced, the chloride content of said medium available for the production of chlortetracycline being controlled to an amount less than the tetracycline in the mash at harvest in parts per million divided by 14.

10. The process of causing organisms chosen from the group consisting of organisms of the species S. aureofaciens, together with natural and artificially-induced mutants thereof to produce tetracycline during fermentation of an aqueous nutrient medium, which comprises restricting the chloride content of said medium to an amount in parts per million less than the parts per million of tetracycline produced by said fermentation at harvest divided by 14 and continuing the fermentation until there is produced at least 500 parts per million of tetracycline and more tetracycline than chlortetracycline in said solution.

11. In a process of producing tetracycline by fermentation with an organism chosen from the group consisting of organisms of the species S. aureofaciens, together with natural and artificially-induced mutants thereof capable of also producing chlortetracycline in the presence of chloride ions the improvement which comprises the step of preparing an aqueous nutrient medium in which the chloride ions are restricted to an amount below that which with the particular strain of S. aureofaciens used and the nutrient substituents of the medium the formation of the chlortetracycline is limited whereby at the conclusion of the fermentation process there is a higher proportion of tetracycline than chlortetracycline.

12. A method of producing tetracycline which comprises aerobically fermenting an aqueous nutrient medium with an organism chosen from the group consisting of organisms of the species S. aureofaciens, together with natural and artificially-induced mutants thereof capable of producing chlortetracycline in the presence of chloride ions, the steps which comprise those of preparing an aqueous nutrient medium in which the chloride ion is low, inoculating said medium with the said microorganism and fermenting until more tetracycline is produced in the medium than there is chlortetracycline present therein, the chloride ion content in the medium being restricted to such extent that the production of chlortetracycline by the microorganism is also restricted thereby.

13. The process of producing tetracycline which comprises aerobically fermenting a chloride-controlled, aqueous, nutrient medium with a chlortetracycline and tetracycline-producing microorganism chosen from the group consisting of organisms of the species S. aureofaciens, together with natural and artificially-induced mutants thereof until at least 500 parts per million of tetracycline is produced, said chloride control being such that the chloride ion available for formation of chlortetracycline during the fermentation process expressed in parts per million and multiplied by 14 is less than the parts per million of tetracycline at the conclusion of the fermentation.

14. The method of producing tetracycline and chlortetracycline in controlled ratios which comprises culturing an organism chosen from the group consisting of the species Streptomyces aureofaciens and mutants and strains thereof in an aqueous fermentation medium so controlled that the available chloride ion content in amounts in parts per million is less than the parts per million of tetracycline which are produced by the fermentation process divided by 14, such control resulting in restriction in the production of chlortetracycline and control of the ratio of tetracycline to chlortetracycline produced so that the proportion of tetracycline is the larger.

References Cited in the file of this patent

UNITED STATES PATENTS

| | | |
|---|---|---|
| 2,482,055 | Duggar | Sept. 13, 1949 |
| 2,516,080 | Sobin | July 18, 1950 |
| 2,609,329 | Niedercorn | Sept. 2, 1952 |

OTHER REFERENCES

Stephens et al.: J. Am. Chem. Soc., vol. 74, Oct. 5, 1952, pages 4976–7.

Jour. Am. Chem. Soc., vol. 75, Sept. 20, 1953, pages 4621–23.